United States Patent [19]

Trubiano

[11] 4,125,270
[45] Nov. 14, 1978

[54] COLLAPSIBLE SEAT IN END GATE FOR NESTABLE SHOPPING CART

[76] Inventor: Antoine Trubiano, 1410-7th Avenue, Pointe aux Trembles, Quebec, Canada

[21] Appl. No.: 782,952

[22] Filed: Mar. 30, 1977

[51] Int. Cl.² .............................................. B62B 11/00
[52] U.S. Cl. .............................................. 280/33.99 B
[58] Field of Search ................................. 280/33.99 B

[56] References Cited

U.S. PATENT DOCUMENTS

| 2,896,959 | 7/1959 | Young et al. | 280/33.99 B |
| 3,157,410 | 11/1964 | Hummer | 280/33.99 B |
| 3,963,255 | 6/1976 | Trubiano | 280/33.99 B |

Primary Examiner—Joseph F. Peters, Jr.
Assistant Examiner—Gene A. Church
Attorney, Agent, or Firm—Charles E. Brown

[57] ABSTRACT

A collapsible seat pivotally secured to an end gate of a nestable shopping cart. The seat has a seating surface and is slidingly attached to a collapsible secondary gate which is hinged to the end gate and which provides a back rest for the seat. The improvement in the collapsible seat structure comprises the seat having opposed side end members pivotally secured at one end of the end gate and each having a free inwardly facing hook end. The side end members extend substantially parallel to one another. A connecting rod is secured to each of the side end members and extends adjacent to the hook ends to define an open ended guide channel between the hook end and the connecting rod. The secondary gate has opposed side end edges received in a respective guide channel. Each guide channel is restricted for sliding displacement along its respective end edge in the area of the back rest. Each hook end lies behind an outer surface of the back rest when the secondary gate is collapsed in the direction of the end gate.

7 Claims, 2 Drawing Figures

U.S. Patent  Nov. 14, 1978  4,125,270
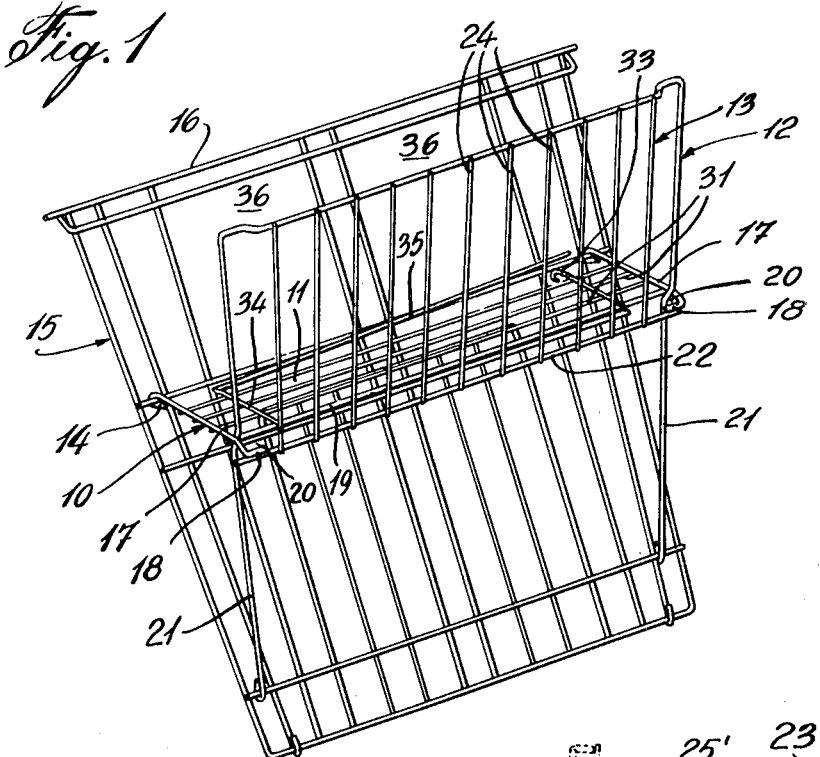
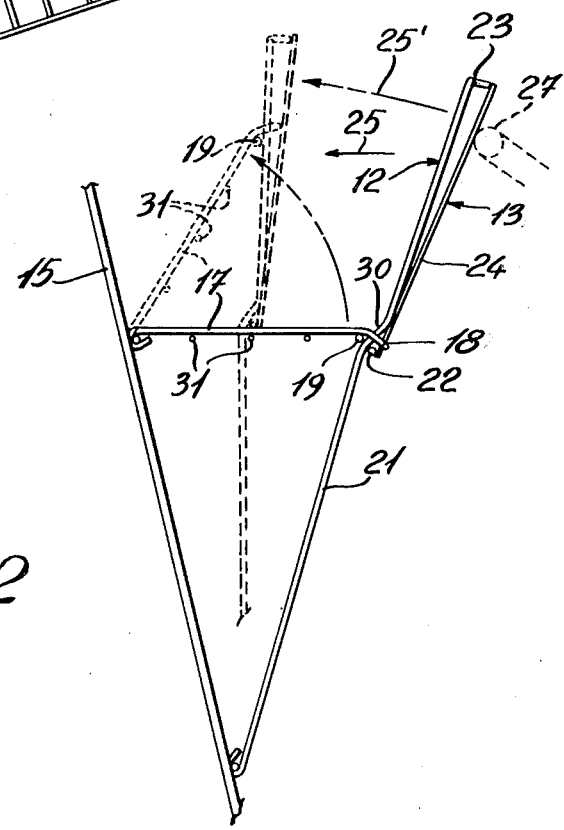

COLLAPSIBLE SEAT IN END GATE FOR NESTABLE SHOPPING CART

BACKGROUND OF INVENTION

1. Field of the Invention

The present invention relates to an improved collapsible seat structure as used on nestable shopping carts.

2. Description of Prior Art

Various types of collapsible seat structures for nestable shopping carts have heretofore been provided. The present invention is an improvement of Applicant's own collapsible seat structure as defined in his Canadian Pat. No. 992,579 issued on July 6, 1976. Another example of collapsible seat structures of this type can be found, for example, in U.S. Pat. No. 2,896,959.

A disadvantage of collapsible seat structures of the prior art is that the seat does not extend fully across the width of the secondary and end gates and when small articles are placed on such seat structure, when shopping, they can fall off through openings at the ends of the seat structure. Another disadvantage with seat structures of the prior art is that it is sometimes difficult to collapse the secondary gate towards the end gate as the seat portion does not readily hinge upwards by the application of force to the secondary gate in the direction of the end gate. A still further disadvantage of known collapsible seat structures is that when the shopping carts are nested one into the other the handle of the forward shopping cart obstructs with structural members or the attachment portion of the seat on the backrest portion of the secondary gate of the cart being nested. This will prevent the nestable shopping carts from being fully nested thereby occupying more space on a floor and sometimes cause damage to the collapsible seat structure. A still further disadvantage of the prior art is that many of these seat structures are complicated to manufacture and sometimes consist of too many parts.

SUMMARY OF INVENTION

It is a feature of the present invention to provide a collapsible seat structure for nestable shopping carts which substantially overcomes all of the above-mentioned disadvantages.

Another feature of the present invention is to provide a collapsible seat structure which is easily constructed and economical to fabricate as it requires fewer parts and less labour.

Another feature of the present invention is to provide a collapsible seat structure which is simple in construction and does not require complicated bends to be made in the metal rods.

According to the above features, from a broad aspect, the present invention provides a collapsible seat pivotally secured to an end gate of a nestable shopping cart. The seat has a seating surface and is slidingly attached to a collapsible secondary gate which is hinged to the end gate and which provides a back rest for the seat. The improvement in the collapsible seat structure comprises the seat having opposed side end members pivotally secured at one end to the end gate and each having a free inwardly facing hook end. The side end members extend substantially parallel to one another. A connecting rod is secured to each of the side end members and extends adjacent to the hook ends to define an open ended guide channel between the hook end and the connecting rod. The secondary gate has opposed side end edges received in a respective guide channel. Each guide channel is restricted for sliding displacement along its respective end edge in the area of the back rest. Each hook end lies behind an outer surface of the back rest when the secondary gate is collapsed in the direction of the end gate.

BRIEF DESCRIPTION OF DRAWINGS

A preferred embodiment of the present invention will now be described with reference to the accompanying drawings in which:

FIG. 1 is a perspective view of the collapsible seat structure of the present invention hinged to an end gate of a shopping cart; and FIG. 2 is a fragmented side view showing the connection of the collapsible seat between the end gate and the secondary gate.

DESCRIPTION OF PREFERRED EMBODIMENTS

Referring now to the drawings and more particularly to FIG. 1, there is shown generally at 10, the collapsible seat structure of the present invention. The seat 10 has a seating surface 11 and is slidingly attached to a collapsible secondary gate 12 as will be described in detail later. The secondary gate 12 is provided with a back rest portion 13 positioned above the seat surface 11. The seat 10 is hinged at 14 to the end gate 15 commonly provided in nestable shopping carts. The end gate 15 is normally hinged at its top end 16 to the top of a rear opening of a nestable shopping cart (not shown). The end gate 15, the seat 11 and the secondary gate 12 are all constructed of steel rods welded together.

The seat 10 has opposed side end members 17 pivotally secured at 14 to a cross member of the end gate 15. The side member 17 is also provided with a free inwardly facing hook end 18. The side members 17 on opposite sides of the seat 11 extend substantially parallel to one another and the hook ends 18 face inwardly towards one another. A connecting rod 19 extends across the side members 17 adjacent the hook ends 18 to define an open ended guide channel 20 between the hook end 18 and a portion of the connecting rod 19.

The secondary gate 12 has opposed side end edges or rods 21 which are received in a respective one of the guide channels 20. Each guide channel 20 is restricted for sliding displacement along its respective end edge 21 in the area of the back rest. This restricted displacement is provided by a stop rod 22 secured across the side end rods 21 adjacent a lower edge of the back rest 13.

Referring now to FIG. 2, it can be seen that the upper end 23 of the secondary gate 12 is outwardly turned. Also, it can be seen that the back rest 13 is constituted by a plurality of vertically extending rods 24 spaced apart and welded between the upper end edge of the top portion 23 and the stop rod 22. These rods 24 extend slightly angularly outwards from the side end edges 21 in the back rest portion 13 whereby the hook end portion 18 of the side members 17 will lie behind the rods 24 of the back rest when the secondary gate 12 is collapsed in the direction of the end gate 15 as indicated by arrow 25. As the secondary gate 12 is collapsed, the side members 17 will hinge upwardly with the channels 20 riding up on the side edge rods 21 with the hook ends lying behind the outer surface of the rods 24 as indicated by the position of the side members 17 in phantom lines at 26. When carts (not shown) are nested one in the other, as is well known in the art, the handle 27 (in phantom line) of the forward cart will push the top portion of the back rest 13 of the secondary gate 12 toward the end gate 15 (in the direction of arrow 25') to collapse the secondary gate. Seeing that the hook ends 18 lie behind the outer surface of the rods 24 and that there are no obstructions over the outer surface, there is no danger of the handle 27 being jammed, to prevent full nesting. Also, the rods 24 extend vertically to provide a smooth surface for sliding engagement with the handle 27.

In order to facilitate the hook end 18 to ride up on the side edge rods 21 of the secondary gate, an offset tapered portion 30 is provided in the side edge rods 21. This tapered portion 30 will cause the connecting rod 19 to ride up or slide up to start the travel of the seat 10 in an arcuate path as the secondary gate is being collapsed on the end gate 15. Also, the hook ends 18 are offset downwardly whereby to permit the secondary gate to collapse in the direction of arrow 25.

As seen more clearly in FIG. 1, the seat surface 11 comprises a plurality of elongated transverse support rods 31 secured between the side members 17. A first transverse rod 32 is secured adjacent an end edge of the seat surface 11 and has a downwardly extending hook end 33. A second transverse rod 34 is secured adjacent an opposite end edge of the seat surface 11 and has a free elongated longitudinal portion 35 extending in the direction of the long axis of the seat and substantially transverse to the first transverse rod 32. The portion 35 is spring biased outwardly of the hook end 33 and is positionable and retained through the downwardly extending hook end 33. A removable seat plate (not shown) having a connecting bore along an edge thereof is attached along the longitudinal portion 35 and is hingeable thereon.

As further shown in FIG. 1, the end gate 15 is provided with leg holes 36 in an upper area thereof adjacent the seat surface 11. The seat plate (not shown) will hinge upwardly to lie over these leg holes 36 whereby to provide a container area over the seat surface 11 which is at least as wide as the secondary gate 12 and free of large openings whereby many small items can be positioned thereon when a person is shopping. Also, it can be seen that the seat structure as above described is very simple in construction and requires very few bends, those bends being made being relatively simple ones. Also, the secondary gate is very easily collapsed in the direction of the end gate requiring minimum amount of pressure to initiate the folding. Still further, there are no obstructions to the handle portion of another shopping cart when two shopping carts are nested one within the other, this being due to the fact that no members protrude beyond the surface of the back rest 13 of the secondary gate. Still further, the seat structure is extremely simple to assemble in that the hook ends 18 of the seat surface 11 are simply slid over the side edges 21 of the secondary gate and do not engage internally of the secondary gate meshing. Also, to remove and repair the seat structure, it is only necessary to undo four hinges whereby to remove the seat surface 11 and the secondary gate 12.

It is within the ambit of the present invention to cover any other obvious modifications of the present invention provided such modifications fall within the scope of the invention as defined by the appended claims.

I claim:

1. In a collapsible seat pivotally secured to an end gate of a nestable shopping cart, said seat having a seating surface and being slidingly attached to a collapsible secondary gate which is hinged to said end gate and which provides a back rest for said seat, the improvement comprising said seat having opposed side end members pivotally secured at one end to said end gate and each having a free inwardly facing hook end, said side end members extending substantially parallel to one another, a connecting rod secured to each of said side end members and extending adjacent to said hook ends to define an open ended guide channel between said hook end and said connecting, rod, said secondary gate having opposed side end edges received in a respective guide channel, each guide channel being restricted for sliding displacement along its respective end edge in the area of said back rest, said secondary gate has an outwardly turned upper end edge defining a top edge of said back rest, a stop rod secured across said side end edges adjacent a lower edge of said back rest, a back rest frame secured between said top edge and said stop rod whereby said back rest frame extends angularly outwards from said side end edges toward said top edge of said back rest, each hook end lying behind an outer surface of said back rest frame when said secondary gate is collapsed in the direction of said end gate.

2. A collapsible seat as claimed in claim 1, wherein said side end edges are side rods, each said side rods having an offset tapered portion in an area adjacent and above said stop rod to facilitate said sliding displacement between said guide channels and end edges when said guide channels are resting on said stop rod.

3. A collapsible seat as claimed in claim 2, wherein said hook ends are offset downwardly to permit said secondary gate to collapse in the direction of said end gate.

4. A collapsible seat as claimed in claim 1 wherein said opposed side end members are rods each inwardly turned at a free end to form said hook ends.

5. A collapsible seat as claimed in claim 4 wherein said seating surface comprises transverse support rods, a first transverse rod secured adjacent an end edge of said seating surface and having a downwardly extending hook end, a second transverse rod secured adjacent an opposite end edge of said seating surface and having a free elongated longitudinal portion extending in the long axis of said seat transverse to said first transverse rod and spring biased to be positioned and retained through said downwardly extending hook end, and a removable seat plate attached to said longitudinal portion.

6. A collapsible seat as claimed in claim 5 wherein said end gate has leg holes in an upper area thereof adjacent said seating surface, said seat plate being hingeable to lie over said leg holes to provide a container area over said seating surface, said seating surface being at least as wide as said secondary gate.

7. A collapsible seat as claimed in claim 1 wherein said seating surface is at least as wide as said secondary gate.

* * * * *